United States Patent Office 2,767,182
Patented Oct. 16, 1956

---

2,767,182

PROCESS OF N-ALKYLATING COMPOUNDS HAVING REACTIVE IMINO GROUPS

Wilhelm Konz, Ingelheim am Rhine, Germany, assignor to C. H. Boehringer Sohn, Ingelheim am Rhine, Germany, a partnership No Drawing. Application August 9, 1954,
Serial No. 448,740

Claims priority, application Germany August 8, 1953

6 Claims. (Cl. 260—255)

This invention relates to a process of N-alkylating compounds having reactive imino groups and more particularly to a process of N-alkylating compounds having reactive imino groups by means of caprolactim-O-alkyl ethers.

It is known to react caprolactim-O-alkyl ethers with compounds having reactive methylene groups whereby alcohol is split off and a new C—C bond between the caprolactim residue and the methylene group is formed. This reaction proceeds according to the following equation:

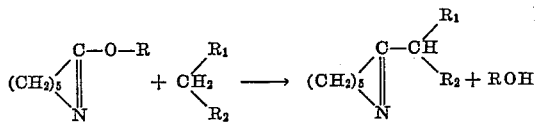

Caprolactim-O-alkyl ethers react also with amines and form thereby amidines according to the following equation:

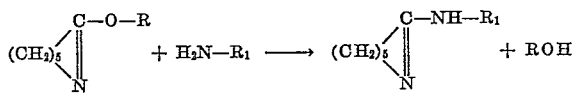

It is furthermore known to condense caprolactim-O-alkyl ethers with compounds having a reactive methylene group and also an imino group in neighboring position to a carbonyl group. With such compounds there are also formed condensation products having the caprolactim residue attached to the methylene group. With barbituric acid, for instance, the reaction proceeds according to the following equation:

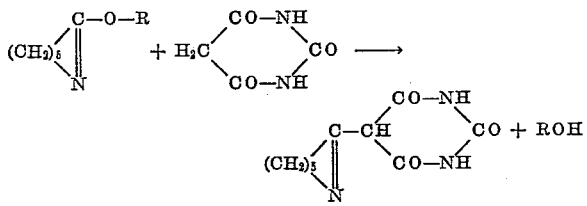

In these known reactions of caprolactim-O-alkyl ethers the caprolactim residue combines with and is attached to the methylene group or to the basic amino group and caprolactim condensation products are formed thereby.

In contrast hereto, it is the object of the present invention to provide a simple and very effective process of using caprolactim-O-alkyl ethers for the N-alkylation of compounds having reactive imino groups in neighboring position to carbonyl groups. In the reactions, according to the present invention, no condensation with the caprolactim residue and no attachment of said residue to the imino group takes place but the alkyl residue of said caprolactim-O-alkyl ether is split off and is attached to the imino group thereby causing alkylation of said group. The reaction proceeds according to the following equation:

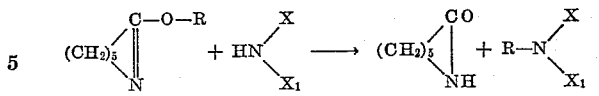

In these formulas R indicates an alkyl radical, such as methyl, ethyl, propyl, butyl, isobutyl, amyl, octyl, and the like, while X and $X_1$ represent organic groups at least one of them having a carbonyl group in neighboring position to the imino group, said groups being free of reactive methylene groups. Compounds of this type are, for example, uric acid, xanthine, 1,3-diethyl xanthine, hypoxanthine, 3-ethyl xanthine, 1–7 dimethyl xanthine and 2–4 diketo tetrahydroquinazoline. X and $X_1$ can also form a ring system together with the imino group. The imino compounds which can be alkylated by means of caprolactim-O-alkyl ethers according to the present invention are of non-basic, acid amide-like nature. Basic imino groups do not react in this manner but yield caprolactim condensation products. If a reactive methylene group is present in the molecule, no N-alkylation takes place since said reactive methylene group reacts first and condenses with the caprolactim-O-alkyl ether and yields caprolactim condensation products. It is quite surprising and could not be expected that caprolactim-O-alkyl ethers are capable of acting as N-alkylating agents and do not form caprolactim-condensation products with certain specific imino compounds when used as reaction components according to the present invention.

Said N-alkylation process has the advantage that caprolactam is formed during said reaction and is almost quantitatively recovered. This compound can readily be reconverted according to methods known per se, into caprolactim-O-alkyl ethers and can then again be used as N-alkylating agents.

This process has the further important advantage that it is possible to operate in neutral medium, thereby avoiding any hydrolytic side-reaction which might occur with compounds sensitive to alkalies, such as many compounds of the purine system.

Depending upon the number of reactive imino groups present in the compound to be N-alkylated, there are obtained mono-, di- or polyalkylated N-derivatives thereof.

The process according to the present invention may be carried out with compounds of any desired constitution provided they contain one or more reactive imino groups in neighboring position to carbonyl groups and provided they are free of reactive methylene groups. Such compounds are, for instance, uric acid, xanthine, hypo-xanthine α- and β-quinazolones, their derivatives, and other imino compounds of the above defined constitution. Such as for example uracil, dialkyl, barbituric acids, alloxan, parabanic acid, isatin, α-pyridone and others.

Preferably the lower O-alkyl ethers of caprolactim are employed in this reaction. Thus, when using caprolactim-O-methyl ether, the corresponding N-methyl derivatives are obtained, when using caprolactim-O-ethyl ether, the corresponding N-ethyl derivatives, and so forth are obtained.

The reaction is preferably carried out at elevated temperature and advantageously at a temperature above 100° C. and in the presence or absence of solvents, such as for example high boiling aromatics, e. g. xylene; dialkyl amides of aliphatic acids, e. g. dimethyl formamide etc.

Isolation of the reaction products is very simple because most of them crystallize from the reaction mixture on cooling. If crystallization does not take place, excess caprolactim-O-alkyl ether and the formed caprolactam can readily be removed by distillation in a vacuum, whereafter the reaction product can be isolated from the residue. The N-alkylated compounds may be further purified by recrystallization from suitable solvents such as water, alcohols, aqueous alcohols, chloroform, acetone, ethyl acetate etc.

The following table lists a number of compounds which are N-alkylated according to the process of the present invention by means of caprolactim-O-methyl ether. In said table the reaction temperature and the reaction duration as well as the yield of the N-alkylated reaction product are given. In general, the reaction is carried out at a temperature between about 100° C. and about 165° C. and preferably at 140–150° C. while the reaction duration may vary from 2 hours to 30 hours and may even be more prolonged.

TABLE

| Starting material | Temperature, °C. | Reaction Time, hours | Reaction Product | Yield, Percent |
|---|---|---|---|---|
| Uric acid | 155 | 18 | 1,3,7,9-tetramethyl uric acid. | 66 |
| Xanthine | 155–165 | 27 | 1,3,7-trimethyl xanthine (caffeine). | 98 |
| 1, 3-Diethyl xanthine. | 150 | 2 | 1,3-diethyl-7-methyl xanthine. | 98 |
| Hypoxanthine | 150 | 8 | 1,7-dimethyl hypoxanthine. | 60 |
| 3-Ethyl xanthine | 150 | 4 | 3, ethyl-1, 7-dimethyl xanthine. | 63 |
| 1, 7-Dimethyl xanthine. | 150 | 4 | 1, 3, 7-Trimethyl xanthine. | 93 |
| 2, 4-Diketo tetrahydroquinazoline. | 150 | 5 | 1, 3-dimethyl-1, 2, 4-diketo tetrahydroquinazoline. | 60 |

The following examples serve to illustrate the present invention without, however, limiting the same thereto.

*Example 1*

1,3,7,9-TETRAMETHYL URIC ACID 8.4 parts of uric acid are heated with 100 parts of caprolactim-O-methyl ether at 150–155° C. for about 18 hours. On cooling, the reaction mixture solidifies to a crystalline paste. The crystals are filtered off by suction and are purified by recrystallization from ethanol. The mother liquor of the crude reaction product is subjected to vacuum distillation to remove excess caprolactim-O-methyl ether and caprolactam formed in this reaction, and yields a further small amount of 1,3,7,9-tetramethyl uric acid. The yield of the pure compound amounts to 66% of the theoretical yield. Its melting point is 222° C.

*Example 2*

1,3,7-TRIMETHYL XANTHINE 15.2 parts of xanthine are heated with 180 parts of caprolactim-O-methyl ether at 155–160° C. for about 28 hours. The reaction mixture is cooled and the precipitated reaction product is recrystallized, for instance, from water. 13.5 parts of pure 1,3,7-trimethyl xanthine are obtained.

*Example 3*

1,7-DIMETHYL HYPOXANTHINE 30 parts of hypoxanthine are heated at 150° C. with 600 parts of caprolactim-O-methyl ether for 6 hours. 5 parts of unreacted hypoxanthine are separated from the hot reaction mixture by decantation or filtration. After cooling 20.2 parts of 1,7-dimethyl hypoxanthine are isolated from the cooled reaction mixture. The yield is 71% of the theoretical yield calculated for reacted hypoxanthine. The crude product is purified by recrystallization from ethanol.

*Example 4*

3-ETHYL-1,7-DIMETHYL XANTHINE 9 parts of 3-ethyl xanthine are heated at 150° C. with 100 parts of caprolactim-O-methyl ether for 4 hours. After cooling, the reaction mixture, 10.7 parts of 3-ethyl-1,7-dimethyl xanthine, corresponding to a yield of 100% of the theoretical yield, are isolated therefrom.

*Example 5*

1,3,7-TRIMETHYL XANTHINE 16.6 parts of 3-methyl xanthine are heated at 155° C. with 160 parts of caprolactim-O-methyl ether. After cooling, the reaction product is filtered off by suction. 17.5 parts of 1,3,7-trimethyl xanthine are obtained, corresponding to a yield of 90% of the theoretical yield.

*Example 6*

1,3-DIMETHYL-2,4-DIKETO TETRAHYDROQUINAZOLINE 8.1 parts of 2,4-diketo tetrahydroquinazoline are heated at 150° C. with 100 parts of caprolactim-O-methyl ether for 5 hours. Excess caprolactim-O-methyl ether and caprolactam formed by the reaction are removed by distillation in a vacuum. The remaining residue is digested with ethanol and yields 6 parts of 1,3-dimethyl-2,4-diketo tetrahydroquinazoline. The yield is 63% of the theoretical yield.

*Example 7*

1,7-DIETHYL HYPOXANTHINE 14.5 parts of hypoxanthine are heated at 150° C. with 150 parts of caprolactim-O-ethyl ether for 6 hours. The reaction mixture is worked up as described in the preceding examples and yields 15 parts of 1,7-diethyl hypoxanthine corresponding to 78% of the theoretical yield. The melting point of the pure product is 142–144° C.

In the above described illustrative examples, solvents, such as xylene, dimethyl formamide etc. may be used.

It will be understood that various modifications and changes may be made from the above examples and that other reacting materials of the classes described may be used within the spirit of my invention and the scope of the following claims.

I claim:

1. The process of N-alkylating the imido groups in heterocyclic compounds selected from the group consisting of uric acid, 2,4-diketo-tetrahydroquinazoline, uracil, dialkyl-barbituric acids, alloxan, parabanic acid, isatin, α-pyridone, α-quinazolones, β-quinazolones and purine-type compounds selected from the group consisting of xanthine, hypoxanthine, 1,3-diethyl xanthine, 3-ethyl xanthine and 1,7-dimethyl xanthine, which comprises reacting said heterocyclic compounds with a lower caprolactim-O-alkyl ether at temperatures ranging from about 100° C. to about 165° C.

2. The process of alkylating imido groups in uric acid which comprises reacting uric acid with a lower caprolactim-O-alkyl ether at a temperature of about 155° C.

3. The process of alkylating the imido groups in a purine-type compound selected from the group consisting of xanthine, hypoxanthine, 1,3 diethyl xanthine, 3-ethyl xanthine and 1,7-dimethyl xanthine, which comprises reacting said purine-type compound with a caprolactim-O-alkyl ether at temperatures ranging from about 150° to 165° C.

4. The process of alkylating the imido groups in 2,4-diketo-tetrahydroquinazoline, which comprises reacting 2,-4-diketo-tetrahydroquinazoline with a caprolactim-O-alkyl ether at a temperature of about 150° C.

5. The process according to claim 1, wherein said caprolactim-O-alkyl ether is the caprolactim-O-methyl ether.

6. The process according to claim 1, wherein said caprolactim-O-alkyl ether is the caprolactim-O-ethyl ether.

No references cited.